United States Patent
Ujiie et al.

[11] 3,788,558
[45] Jan. 29, 1974

[54] CUTTING TORCH

[75] Inventors: Akira Ujiie, Kobe; Hiroshi Shimoyama, Kakogawa; Nanji Ueda, Tokyo, all of Japan

[73] Assignees: Mitsubishiki Jukogyo Kabushiki Kaisha; Koike Sanso Kogyo Kabushiki Kaisha, 03

[22] Filed: Oct. 27, 1972

[21] Appl. No.: 301,369

[30] Foreign Application Priority Data
Oct. 27, 1971 Japan.................................. 46/84681

[52] U.S. Cl................................ 239/424, 266/23 P
[51] Int. Cl............................................. B05b 1/34
[58] Field of Search ........ 239/422, 423, 424, 424.5; 266/23 P

[56] References Cited
UNITED STATES PATENTS 3,339,616  9/1967  Ward, Jr. et al................ 239/422 X
3,484,044  12/1969  Dombruch et al............. 239/424 X Primary Examiner—M. Henson Wood, Jr.
Assistant Examiner—Michael Y. Mar
Attorney, Agent, or Firm—Cushman, Darby & Cushman

[57] ABSTRACT

A cutting torch of divergent nozzle type having a primary cutting oxygan passage, a plurality of secondary cutting oxygen passages arranged in a ring-like form surrounding said primary cutting oxygen passage at the cutting tip, and at least one preheating flame passage arranged to surround said secondary cutting oxygen passages, said primary cutting oxygen passage having an intermediate reduced diameter portion terminating in a flared portion open at a circular nozzle outlet, and the jet of the secondary cutting oxygen from said secondary cutting oxygen passages being adapted to provide an apparent cutting oxygen outlet with a diameter equal to the inner diameter of the ring defined by said secondary cutting oxygen passages.

1 Claim, 10 Drawing Figures

PATENTED JAN 29 1974

CUTTING TORCH

The prior-art cutting torch, as typically shown at a in FIG. 1, is of a construction having a cutting oxygen passage $b$ surrounded by mixture gas passages $c$ for supplying a mixture gas of oxygen and a combustible gas. With this construction, preheating flame $d$ is formed from the mixture gas at the cutting tip to preheat the workpiece $e$ so as to provide a molten pool $f$, which is brought into combustion reaction with a jet of cutting oxygen, stream $g$ from the outlet of the passage $b$ with the resultant formation of slug $h$, thereby forming a cutting groove to ultimately cut the workpiece $e$.

In gas cutting with such a prior-art cutting torch, however, the cutting speed is limited.

Cutting of a workpiece using a cutting torch is achieved in three stages, namely initiation of the combustion-reaction of iron with oxygen at a superficial portion of the workpiece, propagation of the combustion-reaction of iron and oxygen into the inner part of the workpiece and forced removal of the reaction product slug. Thus, the cutting speed may be increased if the efficiency in an individual stage is enhanced.

Presently, however, this is difficult to accomplish. Regarding the first stage, heat of radiation from a gas flame of gas such as propane is the sole resort to rely upon. As for the third stage, the supply pressure of cutting oxygen is 7kg/cm² at most and the mechanical energy of the cutting oxygen stream is quite small, thus imposing a limitation upon the cutting capacity. The effect in the second stage is extremely impeded as the boundary layer produced from the reaction product slug and gas in the cutting zone prevents dispersion of iron and oxygen. Therefore, it is very difficult to increase the cutting speed.

For increasing the cutting speed it is effective to increase the supply pressure of the cutting oxygen. However, no cutting torch effective to this end has been developed so far. Also, at present there is neither means nor technique for utilizing said means superior to a gas flame of such as propane as the heat source for preheating.

The present invention is intended to solve these problems. According to the present invention, there is provided a cutting torch of divergent nozzle type having a primary cutting oxygen passage, a plurality of secondary cutting oxygen passages arranged in a ring-like form surrounding said primary cutting oxygen passage at the cutting tip, and at least one preheating flame passage arranged to surround said secondary cutting oxygen passage, said primary cutting oxygen passage having an intermediate reduced diameter portion terminating in a flared portion open at a circular nozzle outlet, the jet of the secondary cutting oxygen from said secondary cutting oxygen passage being adapted to provide an apparent cutting oxygen outlet with a diameter equal to the inner diameter of the ring defined by said secondary cutting oxygen passages. The main object of the present invention is hence to provide an improved cutting torch which is capable of obtaining an increased cutting speed for the workpiece to be cut and an extremely improved cutting effect.

Since the cutting torch according to the present invention has a primary cutting oxygen passage having an intermediate reduced diameter portion terminating in a flared portion open at a circular nozzle outlet, a divergent high purity oxygen stream having a high mechanical energy is continuously jetted from the outlet.

Also, since the secondary cutting oxygen passages in the cutting torch according to the present invention are provided in a ring-like form surrounding the primary cutting oxygen passage at the cutting tip, the leading part of the weak secondary cutting oxygen stream with respect to the cutting direction will supply weak oxygen to the molten pool formed on the workpiece to promote the preheating function provided by preheating flame supplied through preheating flame formation passage, thus promoting the speed of combustion-reaction of the workpiece as well as promoting the removal of the iron oxide produced by the combusting reaction caused by the primary cutting oxygen stream. Furthermore, the molten pool can be quickly combusted with a secondary cutting oxygen stream and the resultant heat of combustion transmitted to the workpiece may contribute to the preheating effect.

Besides, part of the secondary cutting oxygen stream following the primary cutting oxygen stream undergoes a combustion reaction with an extremely limited part of the cutting groove formed by the primary cutting oxygen stream. Since this reaction is limited within an extremely small zone, it proceeds very quickly, and also the amount of the removed slug is quite small compared to the slug removed by the primary cutting oxygen stream.

The present invention will now be described with reference to a preferred embodiment illustrated in the drawings. In the drawings.

Figure 1:
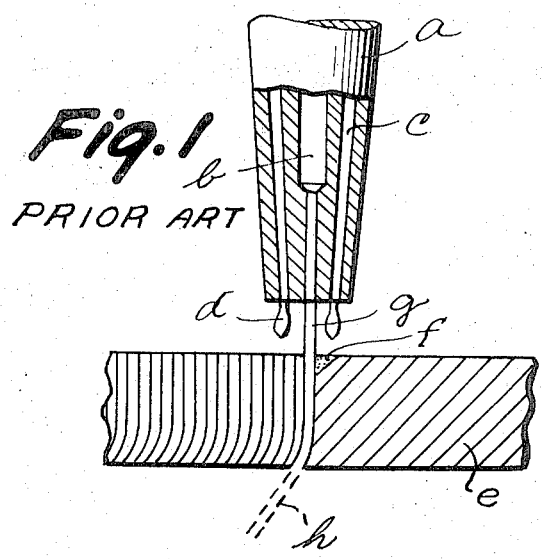
FIG. 1 is a sectional view showing a prior-art cutting torch.
Figure 2:
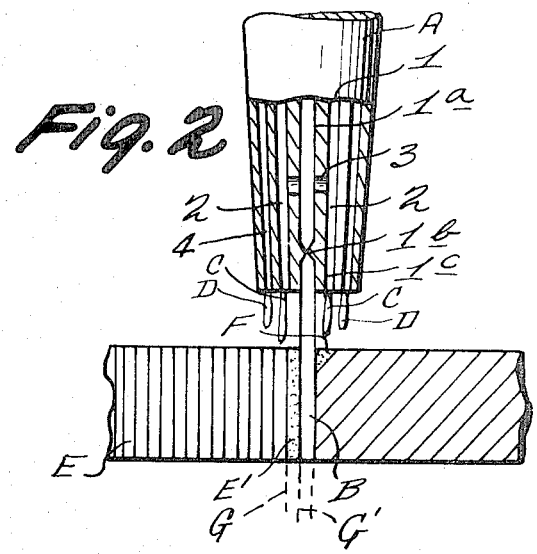
FIG. 2 is a sectional view showing an embodiment of the cutting torch according to the present invention.

A cutting torch A (shown in FIG. 2) has a central, primary cutting oxygen stream passage or nozzle 1 for continuously supplying high purity oxygen having kinetic energy, and which includes a uniform diameter portion 1a continuous with a reduced diameter portion 1b with a diameter of 0.5 to 2 mm terminating in a flared portion 1c with a flaring angle of 5° to 10° into a circular nozzle outlet having a diameter of 150 to 250 times that of the reduced diameter portion 1b for forming a divergent oxygen stream. The cutting torch A is also provided with a plurality of secondary cutting oxygen stream passages 2 communicating with the central passage 1 via bypasses 3 and arranged in a ring-like form surrounding the passage 1 at the cutting tip.

Figure 3:
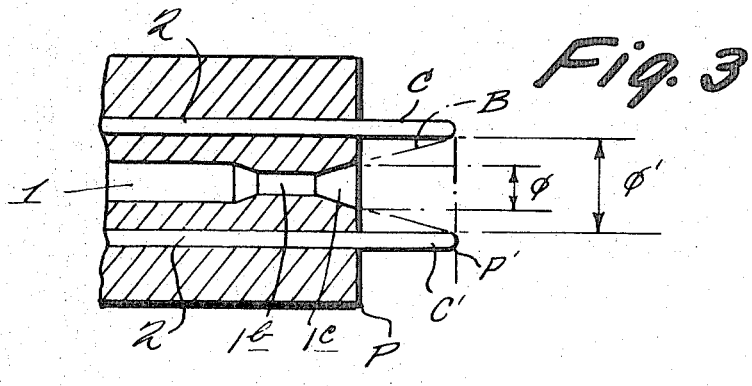
FIG. 3 is an explanatory view of the cutting oxygen stream supply section.

The primary cutting oxygen stream B supplied from the nozzle of the passage 1 is thus surrounded by a ring-like secondary cutting oxygen stream C supplied via the passages 2. FIG. 3 shows the divergent form of the primary cutting oxygen stream B. By virtue of the ring-like wall of the secondary cutting oxygen stream permitting the divergency of the primary stream, the cutting tip which is usually located at point P is displaced to point P', accordingly the nozzle outlet diameter of the passage 1 is increased from Φ to Φ', i.e., the inner diameter Φ' of the ring defined by the passages 2.

The cutting torch A is further provided with a preheating flame passage or passages 4 surrounding said passages 2, thereby providing a preheating flame (D) directed to the workpiece E.

With the illustrated cutting torch of the construction described above, part of the weak, secondary cutting oxygen stream C supplied from those passages 2 which are ahead of molten pool F formed on a steel workpiece E by means of the preheating flame supplied thereto from the preheating flame passage or passages 4 can increase the combustion speed to promote the removal of the iron oxide produced by combusting reaction proceeded with the primary cutting oxygen stream B. The passages (2) which are so ahead with respect to the cutting direction being indicated by an arrow. The molten pool F is quickly put into combustion reaction with the secondary cutting oxygen stream and the heat of combustion is transmitted to the workpiece E so as to provide the preheating effect.

Part of the secondary cutting oxygen stream following the primary cutting oxygen stream undergoes the combustion reaction with an extremely limited part of iron E' adjacent opposite edges of the cutting groove formed in the workpiece E by means of the primary cutting oxygen stream A. This combustion reaction takes place in an extremely small zone so that the reaction proceeds rapidly. Also, the slug G to be removed is quite smaller in amount as compared to the slug G' to be removed due to the primary cutting oxygen stream.

Figure 4:
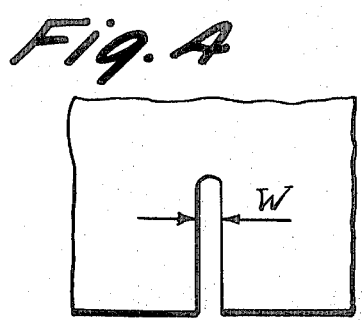
FIGS. 4 and 5 are top views showing cutting grooves respectively obtained by the cutting torches according to the present invention and a prior-art cutting torch.
Figure 5:
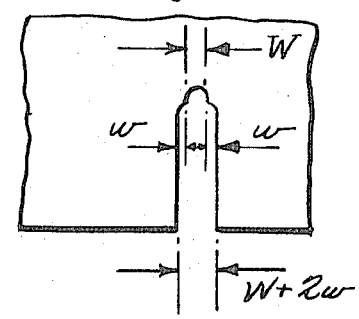

FIGS. 4 and 5 show the top view of workpieces formed with cutting grooves obtained respectively in a conventional manner and according to the present invention. The groove according to the present invention has a larger width because the primary cutting oxygen stream B is surrounded by the secondary cutting oxygen stream C'. The afore-mentioned small part of iron E' reacting with the secondary cutting oxygen stream provides a width $w$ in FIG. 5 so that the overall width of the cutting groove is $W + 2w$, wherein $W$ is the width of the cutting groove due to the primary cutting oxygen stream.

Figure 6A:
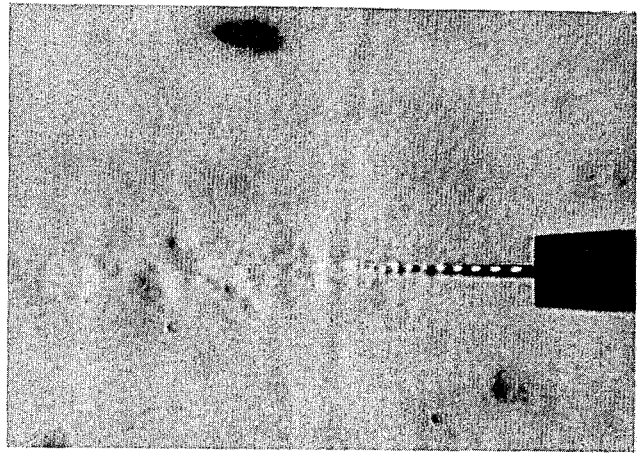
FIGS. 6a, 6b and 6c are photographic pictures of cutting oxygen streams obtained by cutting torches according to the present invention and a cutting torch of the prior art.
Figure 6B:
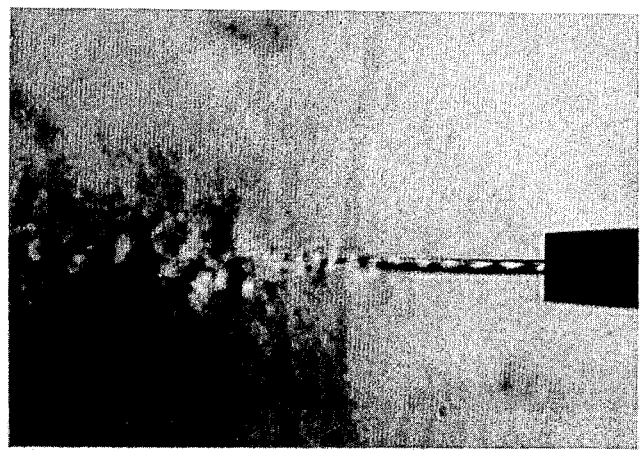
Figure 6C:
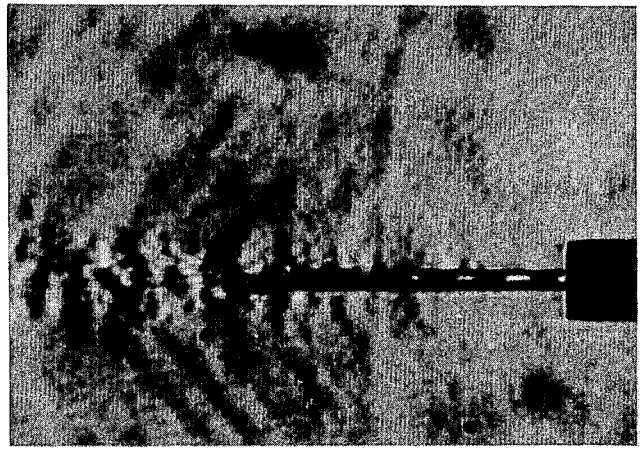

As mentioned earlier, according to the present invention, the diameter of the jet outlet of the primary cutting oxygen stream supplied through the passage 1 is increased at the apparent tip position, thus being equal to the inner diameter Φ' of the inner ring defined by the passages 2. Thus, it is possible to obtain a jet of the primary cutting oxygen stream which is more desirable for the cutting as is typically shown in FIG. 6b (with a primary cutting oxygen pressure of 16 kg/cm$^2$) and in FIG. 6c (with a primary cutting oxygen pressure of 36 kg/cm$^2$). It will be seen that according to the present invention the stream is sharp and long compared with that obtained from a conventional cutting tip as shown in FIG. 6a.

Thus, while the cutting oxygen supply pressure at the cutting tip has conventionally been 7 kg/cm$^2$ at most, with the cutting torch according to the invention, it is possible to obtain an excellent jet of the primary cutting oxygen stream with a pressure of up to around 50 kg/cm$^2$ by appropriately selecting the ratio ranging from the nozzle outlet diameter to the diameter of the reduced diameter portion, such as for instance from 1.64 to provide a pressure of 16 kg/cm$^2$ to 2.04 to provide a pressure of 36 kg/cm$^2$.

Figure 7:
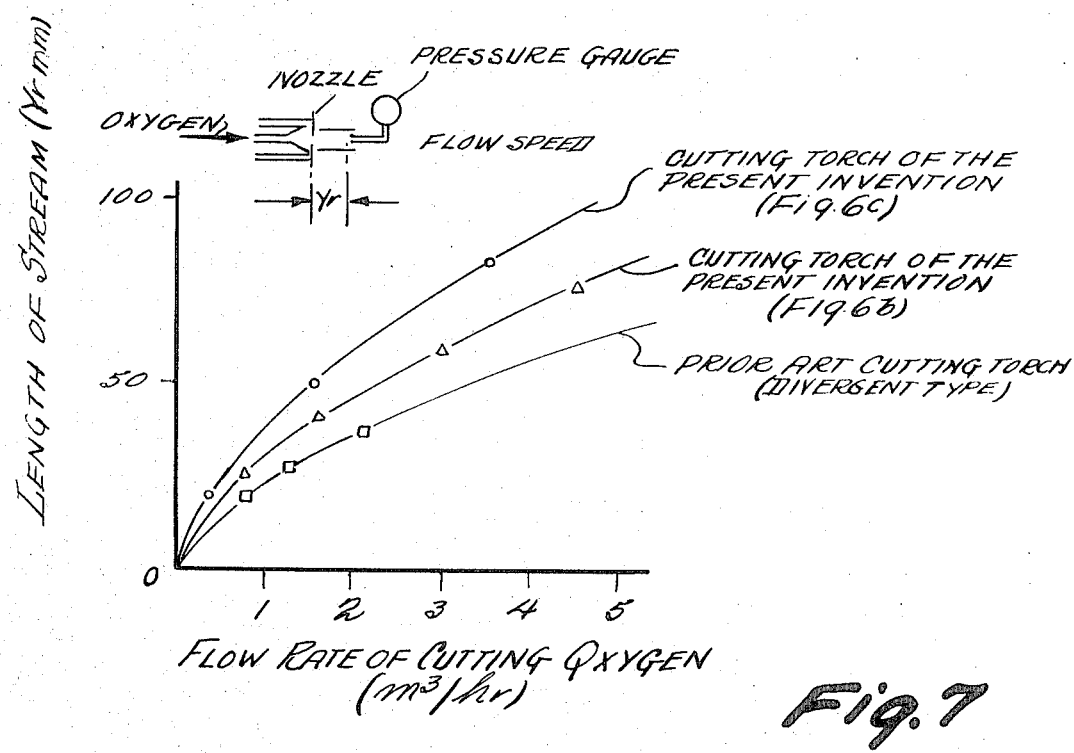
FIGS. 7 and 8 are graphs respectively showing the length of the stream and cutting speed for various thicknesses of the workpiece that are obtained with cutting torches of the invention and of the prior art.

Also, with the cutting torch according to the present invention, the length of the primary cutting oxygen stream can be greatly increased as compared to the conventional cutting torch, thus extremely increasing the mechanical energy of the stream, as will be seen from FIG. 7.

Figure 8:
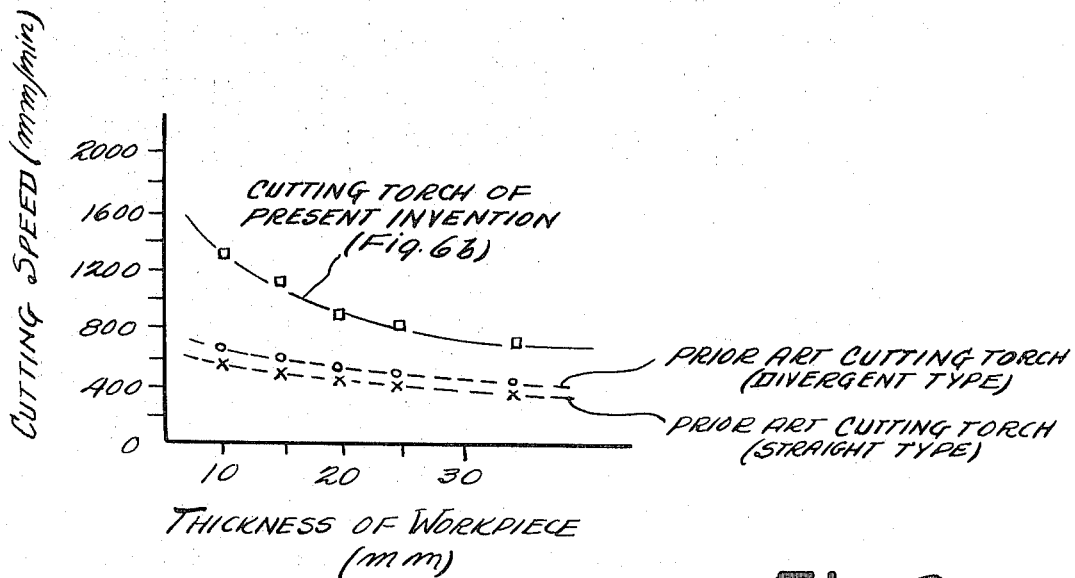

FIG. 8 compares the cutting speed of the cutting torch according to the present invention with that of conventional cutting torches with respect to various thicknesses of the workpiece. As will be seen, the cutting speed according to the present invention is 2.0 to 2.5 times that obtainable with a conventional straight nozzle torch and 1.5 to 2.0 times that obtainable with a conventional 7 kg/cm$^2$ divergent nozzle torch. Thus, while the flow rate is high compared to the prior-art torches, a great reduction of man hours with an increase in the cutting speed can be expected, thus reducing the cutting cost as well as improving the quality of the cutting edge.

While only one embodiment of the invention has been described, it is by no means limitative, but various changes and modifications may be made without departing from the scope and spirit of the present invention.

What is claimed is:

1. A cutting torch of divergent nozzle type having a primary cutting oxygen passage, a plurality of secondary cutting oxygen passages arranged in a ring-like form surrounding said primary cutting oxygen passage at the cutting tip, and at least one preheating flame passage arranged to surround said secondary cutting oxygen passages, said primary cutting oxygen passage having an intermediate reduced diameter portion terminating in a flare portion open at a circular nozzle outlet, and the jet of the secondary cutting oxygen from said secondary cutting oxygen passages being adapted to provide an apparent cutting oxygen outlet with a diameter equal to the inner diameter of the ring defined by said secondary cutting oxygen passages.

* * * * *